Dec. 25, 1951  R. L. ALLEN  2,579,532
AUTOMATIC BRAKE FOR FISHING REELS
Filed April 23, 1946

Inventor
R. L. Allen
By Robb & Robb  Attorneys

Patented Dec. 25, 1951

2,579,532

UNITED STATES PATENT OFFICE 2,579,532

AUTOMATIC BRAKE FOR FISHING REELS

Robert L. Allen, Atlanta, Ga.

Application April 23, 1946, Serial No. 664,333

6 Claims. (Cl. 242—84.5)

The present invention relates to fishing reels, and more especially to improved brake means for such reels to prevent the reel from overrunning and the line from back-lashing during the casting operation.

Automatic brakes for fishing reels have heretofore been proposed and used to a limited extent, but have not been successful from a practical standpoint. The prior brakes were largely based on the same principle and utilized a spring to actuate the brake means so that when there is tension on the line, the brake is released, but when the line slacks, a braking force is applied to the line spool by the spring to stop or slow down the spool until the line is again under tension. Usually, the braking action is produced by a brake shoe which is forced against a drum or against a part of the line spool of the reel by the spring aforesaid. Release of the brake requires that sufficient tension be applied to the line to counteract the force of the spring. On the other hand, in applying the brake, there is no braking effect until the brake shoe comes into contact with the brake drum or line spool, and any further slack in the line will have no effect on the braking force since this is controlled by the spring tension. In other words, the brake is either off or on, with no variation or modulation of the braking effect. In all cases, the greatest tension in the line must occur when the brake is released or in the off position since the spring force is transferred from the brake shoe to the release instrumentalities. This is a distinct disadvantage since it decreases the casting range.

The present invention is based upon the same general principles above referred to insofar as the brake is applied when slack occurs in the line, and is released when the line is under tension, but the brake has been greatly improved to overcome the practical disadvantages and limitations of the prior fishing reel brakes.

The primary object of the invention is to provide an improved automatic brake for fishing reels which is simple in construction and highly efficient in operation.

In attaining the foregoing primary objects, my invention resides in the provision of an improved automatic brake mechanism which includes a brake actuating arm or lever controlled by a spring which is so constructed and arranged as to cause the braking torque of the arm to increase as the brake is applied, and to reduce the torque to little or nothing when the brake arm is in the full off position. This has the advantage, during the casting operation, of requiring a very slight tension on the line to hold the brake in the off position, and at the same time, any slackening of the line causes the brake to be applied with sufficient force to stop the reel or slow it down quickly enough to prevent overrunning of the reel or back-lashing of the line.

A further object of the invention is to provide an automatic brake for fishing reels which is so constructed and arranged that when the brake is applied, the braking force is much greater when the line is running out or paying off, than when the line is being rewound, thereby making it unnecessary to release the brake arm for the rewinding operation. In other words, the brake is partially self-energizing in the direction of rotation of the reel for unwinding or paying off the line, and has very little, if any, braking effect when the line is being rewound or retrieved.

Other and further objects and advantages of the invention will be hereinafter described and the novel features thereof defined by the appended claims.

Figure 1:
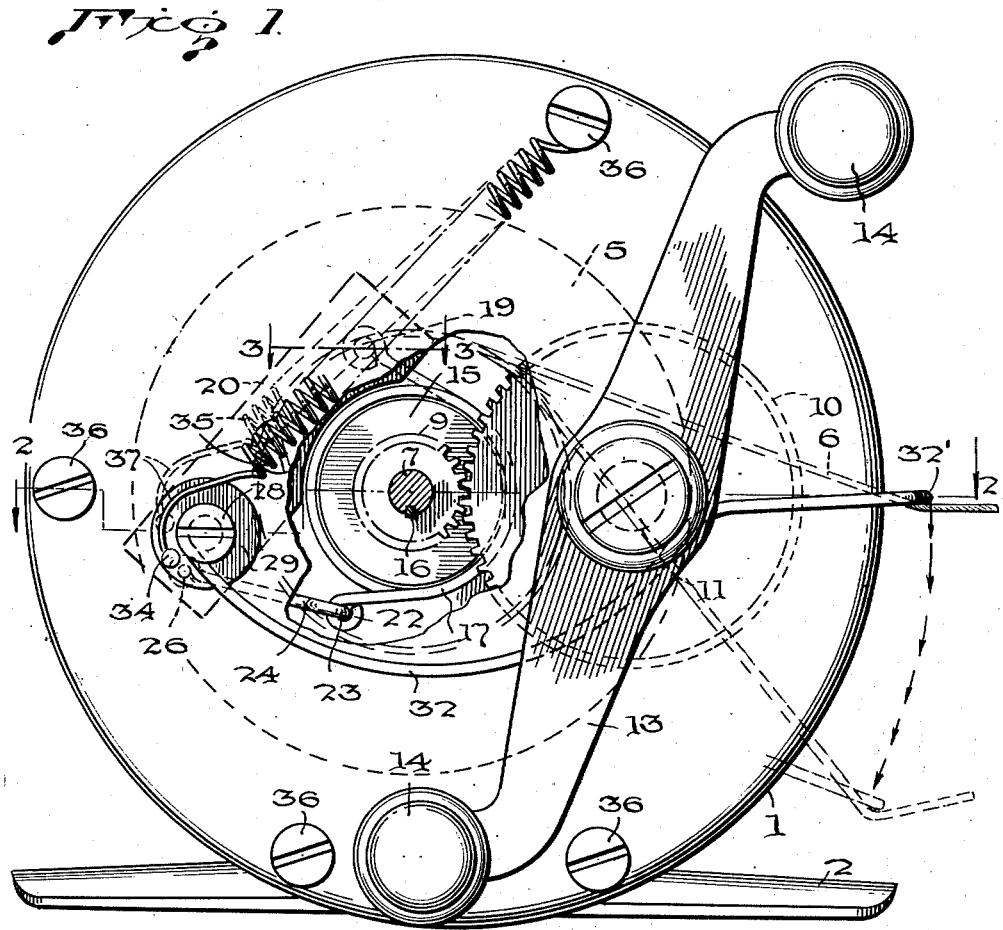
Figure 1 is a view in side elevation of a fishing reel having my improved automatic brake embodied therein, with portions of the reel frame or head broken away to more clearly show certain details of the brake mechanism.
Figure 2:
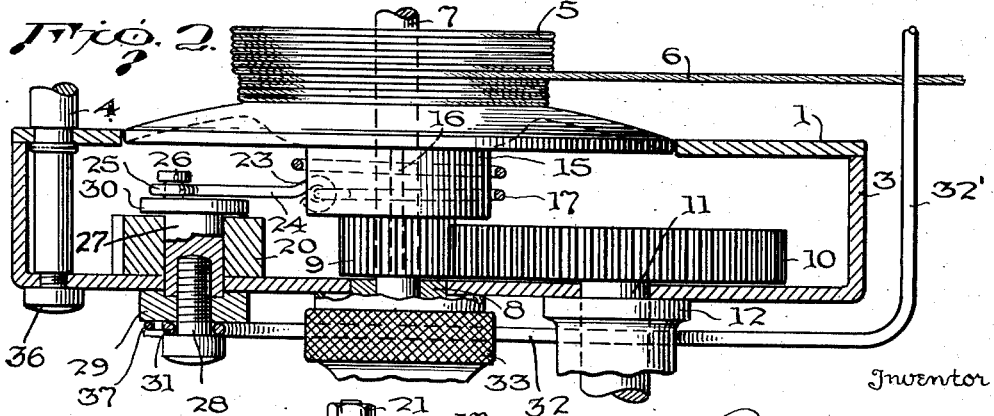
Figure 2 is a fragmentary sectional view taken on the line 2—2 of Figure 1.
Figure 3:
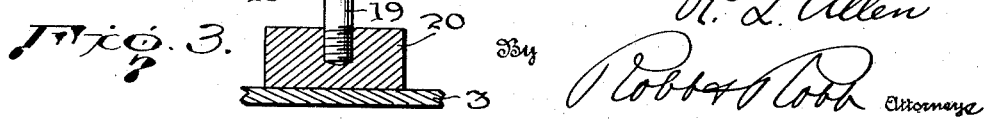
Figure 3 is a fragmentary detail sectional view taken on the line 3—3 of Figure 1.

Like reference characters designate corresponding parts in the several figures of the drawing, wherein I generally denotes the reel frame which may be of any conventional construction, said frame being provided at the bottom thereof with the usual support designated 2 which is adapted to be attached to the fishing pole or rod. As usual, the reel frame is provided at each end with a head, only one of which is shown in the drawing and is designated 3, this head preferably having the form of a housing. The head 3 is attached to the head at the opposite end of the reel (not shown) in any suitable manner as by means of one or more cross bars or spacers designated 4. Journaled in the reel frame and extending thereacross from end to end or head to head is a line spool 5 on which the fishing line is adapted to be wound, and from which the line is unwound or paid off during the casting operation, the line being designated 6. The line spool 5 is carried by a spool shaft 7 which is rotatable therewith and extends through the head 3 of the reel frame in which the shaft is journaled in a bearing 8 in the usual manner. Keyed to the shaft 7, or otherwise attached thereto is a pinion 9 which meshes with another pinion 10 fixed to the inner end of a crank shaft or winding shaft 11, said shaft 11 extending outwardly through the outer end of the head 3 and being journaled in a suitable bearing 12 carried by the head. Attached to the outer end of the shaft 11 is a crank 13 having the usual crank handles 14, 14 extending therefrom at its opposite ends in the usual manner.

It is to be understood that the details of the reel construction as above described are not essential to the present invention, and are given merely for purposes of illustration of one practical application of my invention.

Disposed within the head 3 and fixed to the spool shaft 7 inwardly of the pinion 9 is a brake drum 15. If desired, both the brake drum 15 and the pinion 9 may be keyed to the spool shaft 7 by a common key 16, or they may be attached separately if desired. Extending about the brake drum 15 is a flexible brake band 17, said band having one or more (preferably one and a half) turns about the drum 15. The brake band is preferably made of spring steel or bronze or other suitable material, and is loosely wound about the brake drum. One end of the brake band 17 is bent into the form of an eye, as at 18, and is anchored to a post 19 which is carried by a block or plate 20 which is attached to the inside face of the outer wall of the head 3. For convenience, the post 19 may have threaded engagement with the block or plate 20, and its other end is threadedly engaged with a nut 21 which serves to clamp the fixed end of the brake band 17 to the post.

The opposite or free end of the brake band 17 is likewise bent into the form of an eye, as at 22, which engages through the eye 23 on one end of a link 24. The opposite end of the link 24 is also bent into the form of an eye, as at 25, which engages over an eccentric pin 26 extending inwardly from the inner end of a short shaft 27 which is rotatably mounted in the block 20 and extends therethrough and through the outer wall of the reel head 3 to the outside of the head.

Fixed to the outer end of the shaft 27 by means of a screw 28 is a washer or cap plate 29 which serves, together with the head 30 on the opposite end of the shaft 27, to prevent axial movement of the shaft 27 in the block 20, but allowing free rotation thereof.

Clamped between the head of the screw 28 and the washer or cap 29 is an eye 31 formed on one end of a brake actuating arm 32, said arm extending forwardly to the front side of the reel.

It will be seen from the foregoing that the brake actuating arm 32 is rigidly attached to the shaft 27 for rotation therewith, the shaft 27 acting as a pivot for pivotal movement of the arm 32 in an upward and downward direction. To allow for such movement, the arm is curved downwardly so as to clear the bearing cap 33 of the spool shaft bearing 8, beyond which the arm 32 curves upwardly so that it normally engages the under side of the crank shaft bearing 12 when the brake is in a released condition. Beyond the crank shaft, the arm 32 continues in a more or less horizontal direction to a point somewhat beyond the forward side of the reel frame, and thence the arm is bent laterally, as at 32', so that it continues in a horizontal direction transversely across the front side of the frame in spaced relation thereto. As clearly shown in the drawing, the fishing line 6 leads forwardly from the spool 5 and passes beneath the portion 32' of the brake actuating arm 32 at the front side of the reel frame, the line being free to shift transversely beneath the arm as it is wound onto and unwound from the line spool 5. If desired, the reel may be equipped with suitable line leveling means (not shown) so that the line will be wound level on the spool. However, my invention is not limited to use with reels equipped with self-leveling means, and the leveling means may be omitted if preferred.

At the outside of the reel head 3, and extending laterally outwardly from the cap or washer 29 is an eccentric pin 34 which is movable with the cap or washer 29 on rotation of the shaft 27 responsive to upward and downward movements of the brake actuating arm 32. Attached to the eccentric pin 34 is one end of a coil spring 35, the opposite end of which is anchored to one of the screws 36 which serve to attach the reel head 3 to the cross bars 4 of the reel frame.

As will be seen from reference to Figure 1 of the drawing, the eccentric pin 34 is so positioned on the washer or cap 29 that when the brake actuating arm 32 is in its raised or brake-releasing position, the eccentric pin lies slightly to the left of an imaginary line joining the central axis of the shaft 27 and the center of the screw 36 to which the opposite end of the spring 35 anchored. The end of the spring 35 which is connected to the eccentric pin 34 is offset and curved around the screw 28 as indicated at 37 so that the center line of the spring 35 passes very near the central axis of the shaft 27. Thus, when the parts of the brake mechanism are in the full-line positions as shown in Figure 1 of the drawing, corresponding to the released condition of the brake, the spring 35 has little or no effect upon the shaft 27, and consequently upon the brake actuating arm 32. Consequently, very little tension on the line 6 is required to hold the brake actuating arm 32 in its brake-releasing position.

On the other hand, should any slack occur or tend to occur in the line 6, the brake actuating arm will move downward (in a clockwise direction) responsive to the slight pull exerted by the spring 35 which is just sufficiently off center with relation to the shaft 27 at the start of the brake application, as to cause the eccentric pin 34, and consequently the shaft 27, to shift in a clockwise direction. As the clockwise movement of the eccentric pin 34 continues, the spring 35 will be thrown more and more off center, thereby increasing the torque created by the spring and tending to rotate the shaft 27 in a clockwise direction, as viewed in Figure 1. This clockwise rotation of the shaft 27 causes the eccentric pin 26 on the inner end of the shaft to also rotate or shift in a clockwise direction, thereby exerting a pull on the link 24 connected to the brake band 17, and causing the brake band to be contracted about the brake drum 15, applying the brake. Due to the change in the position of the center line of the spring 35 as the brake actuating arm 32 moves downward in a clockwise direction, causing the spring to move farther and farther outwardly away from the central axis of the shaft 27, the braking force or effect produced by the spring will be directly proportional to the movement of the brake actuating arm. In other words, the torque on the shaft 27 increases as the shaft and the brake actuating arm 32 are shifted in a clockwise direction from the brake released or off position. The initial torque necessary to rotate the shaft 27 and apply the brake need be only sufficient to overcome the friction of the parts of the brake mechanism. In all positions of the brake arm 32 and the brake arm shaft 27, the torque, caused by the spring 35 acting on the brake arm shaft, need be only slightly greater than the torque required to apply the brake in any given position of the brake arm. This has the effect of requiring only a slight force on the brake arm to move it toward the off position from any position of the brake arm. This effect is established by the arrangement of the spring and the eccentric pin 34 relative to the central axis of the shaft 27, as previously described.

Due to the construction and operation as above described, the brake is fully automatic and operates smoothly, and only a very slight tension on the line is required to release the brake. A slight slack in the line, or if the line stops, causes the brake to be automatically applied with sufficient force to slow the reel spool down or stop the spool before the line tangles or back-lashes. Since the parts of the brake mechanism are preferably made of metal and may be lubricated, water in the reel will have no detrimental effect on the operation of the brake.

While the spring 35 has been shown in the drawing at the outside of the reel head 3, it will be understood that this spring and the eccentric pin 34 may be arranged inside the head 3 if preferred, where it will be fully protected and out-of-the-way. If preferred, the tension spring 35 may be replaced by a compression spring to obtain the same result, in which event, the eccentric pin 34 must be located on the opposite side of the axis of the shaft 27. Also, instead of applying the braking effect directly to the line spool shaft 7, the same result can be obtained by applying the brake to the crank shaft 11. While the use of a flexible brake band is preferred, the same general arrangement of the brake actuating mechanism can be applied to shoe type brakes.

As previously mentioned, the flexible brake band 17 is preferably made of spring steel or spring bronze or other suitable springy material. When the brake actuating arm 32 is in the brake releasing position, the band 17 is sufficiently loose to permit free rotation of the brake drum 15, and consequently the line spool 5. As the line is running out or paying off from the spool 5, the braking force applied by the band 17 will be much greater than when the line is being rewound or retrieved. This is due to the fact that the brake band 17 is wound upon the brake drum 15 in such a direction that it tends to contract automatically when it engages the drum 15 during the unwinding or running out of the line. On the other hand, when the line is being rewound or retrieved, the rotation of the brake drum in the opposite direction tends to cause the brake band to release, with the result that the brake mechanism has little or no braking effect during the rewinding operation. This action just described is therefore in the nature of a self-energizing or servo action.

While the specific details of the invention have been herein shown and described, the invention is not confined thereto as changes and alterations may be made without departing from the spirit thereof as defined by the appended claims.

I claim:

1. In a fishing reel, a frame, a shaft rotatably mounted in the frame, a line spool mounted on the shaft and fixed thereto, a brake drum also mounted on the shaft and fixed thereto, a flexible brake band embracing the drum and having one end anchored to the frame, a second shaft rotatably mounted in the frame and carrying an eccentric pin at one end thereof which is operatively connected to the opposite end of the brake band aforesaid, a brake actuating arm fixed to the second shaft and pivotally movable in opposite directions about the axis of rotation of said latter shaft, said arm being extended transversely across the front of the reel frame in spaced relation thereto and parallel to the axis of the line spool, with the arm adapted to normally rest upon the upper side of the line when leading forwardly from the spool, a second eccentric pin carried by the second shaft, and a tension spring having one end connected to the second eccentric pin and its opposite end anchored to the reel frame.

2. A fishing reel as defined in claim 1, wherein the second eccentric pin and the point of anchorage of the opposite end of the spring normally respectively lie on opposite sides of the axis of rotation of the second shaft when the brake band and the actuating arm are in their brake releasing positions.

3. A fishing reel as defined in claim 1, wherein the second eccentric pin and the point of anchorage of the opposite end of the spring normally respectively lie on opposite sides of the axis of rotation of the second shaft when the brake band and the actuating arm are in their brake releasing positions, with the center line of the spring lying in an imaginary plane intersecting the second shaft closely adjacent to the central axis thereof.

4. A fishing reel as defined in claim 1, wherein the flexible brake band extends about the brake drum for at least one full turn.

5. A fishing reel as defined in claim 1, wherein the flexible brake band extends about the brake drum for at least one full turn, and the direction of winding of the band from its end which is anchored to the frame being the same as the direction of rotation of the line spool during unwinding of the line therefrom.

6. In a fishing reel control mechanism, a fishing reel including a spool for fishing line, a brake drum connected for rotation with the spool, a brake member mounted adjacent the brake drum and constructed and arranged to resiliently urge itself toward brake released position, a control lever mounted to contact the line and movable in accordance with tension in the line, means connecting the control lever with the brake member to enable movement of the control member to move the brake member to brake engaged position and means indepndent of said line for normally urging said control lever toward brake engaged position including mechanism providing a decreasing force on said lever as said lever is moved toward brake released position.

ROBERT L. ALLEN.

REFERENCES CITED

The following references are of record in the file of this patent:

UNITED STATES PATENTS

| Number | Name | Date |
|---|---|---|
| 843,514 | Baumgartel | Feb. 5, 1907 |
| 1,398,429 | Harradine | Nov. 29, 1921 |
| 1,539,646 | Catucci | May 26, 1925 |
| 1,609,684 | Bellow | Dec. 7, 1926 |
| 2,059,763 | Wenzel | Nov. 3, 1936 |
| 2,083,927 | Sinex | June 15, 1937 |
| 2,205,641 | Wilson | June 25, 1940 |

FOREIGN PATENTS

| Number | Country | Date |
|---|---|---|
| 345,872 | Great Britain | Apr. 2, 1931 |
| 509,505 | Germany | Oct. 9, 1930 |
| 38,168 | France | Jan. 13, 1931 |
| | Addition to No. 579,018 | |
| 645,017 | France | Oct. 18, 1928 |